United States Patent [19]

Aihara

[11] Patent Number: 4,829,331

[45] Date of Patent: May 9, 1989

[54] CAMERA HAVING AUTO-FOCUSSING DEVICE

[75] Inventor: Yoshihiko Aihara, Yokohama, Japan

[73] Assignee: Canon Kabushiki Kaisha, Tokyo, Japan

[21] Appl. No.: 140,306

[22] Filed: Dec. 31, 1987

[30] Foreign Application Priority Data

Jan. 12, 1987 [JP] Japan .................................... 62-3143

[51] Int. Cl.⁴ .............................................. G03B 3/00
[52] U.S. Cl. .................... 354/400; 354/402; 354/195.1
[58] Field of Search ............... 354/400, 402, 403, 409, 354/195.11

[56] References Cited

U.S. PATENT DOCUMENTS

| | | | |
|---|---|---|---|
| 4,154,517 | 5/1979 | Tamura et al. | |
| 4,159,864 | 7/1979 | Yasukuni et al. | 354/195.11 |
| 4,344,679 | 8/1982 | Yagi et al. | 354/409 |
| 4,362,372 | 12/1982 | Kiesel | 354/195.11 |
| 4,470,681 | 9/1984 | Johnson | 354/403 |

Primary Examiner—Russell E. Adams
Attorney, Agent, or Firm—Fitzpatrick, Cella, Harper & Scinto

[57] ABSTRACT

A camera having an auto-focus device includes a circuit for compensating the aperture value in response to changes of the zoom lens. A focus detection circuit detects the focus condition of first and second objects in the field of view. An aperture calculation circuit determines a signal corresponding to a difference between the in-focus position of the lens to the first object and the in-focus position of the lens to the second object. The aperture value is determined when both objects fall within the depth of field on the basis of the difference signal. The compensation circuit compensates the aperture value in response to the change of the zoom lens. The compensated aperture value is determined so that the first and second objects are both within the depth of field of the changed zoom state.

10 Claims, 13 Drawing Sheets

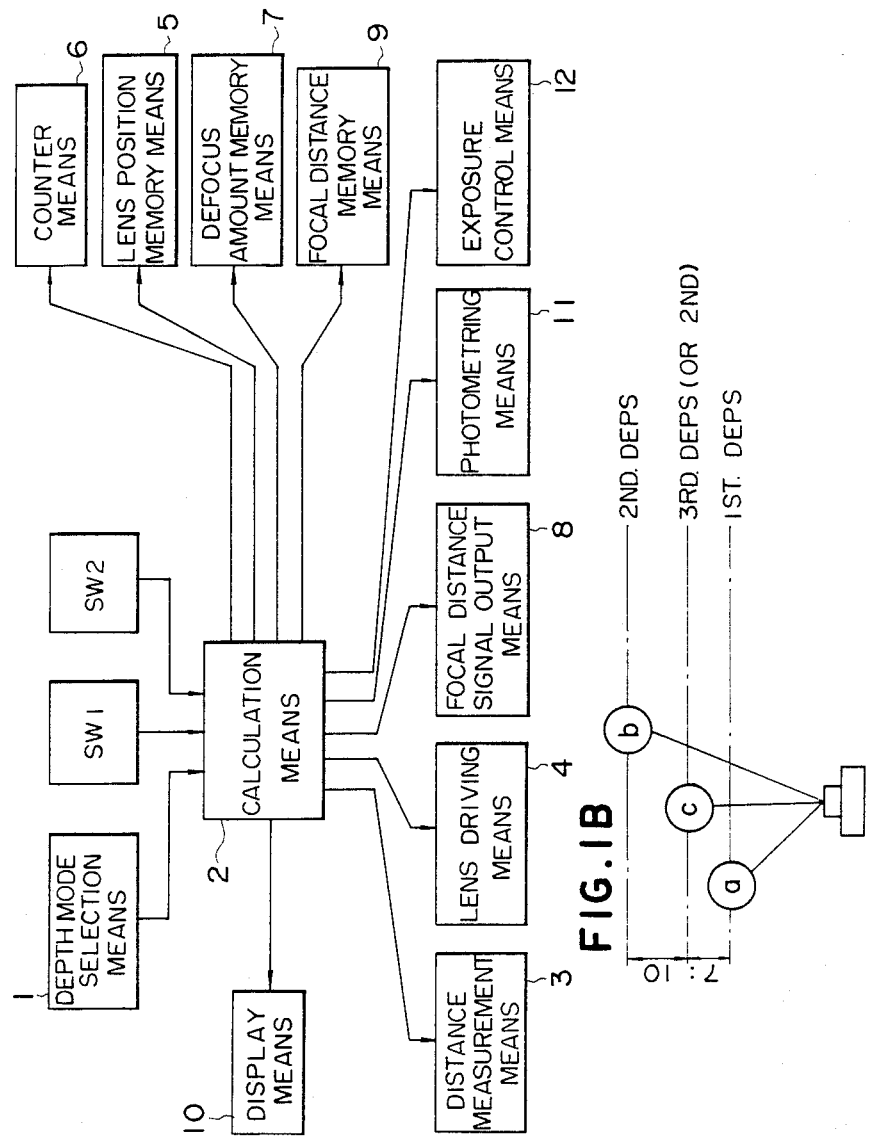

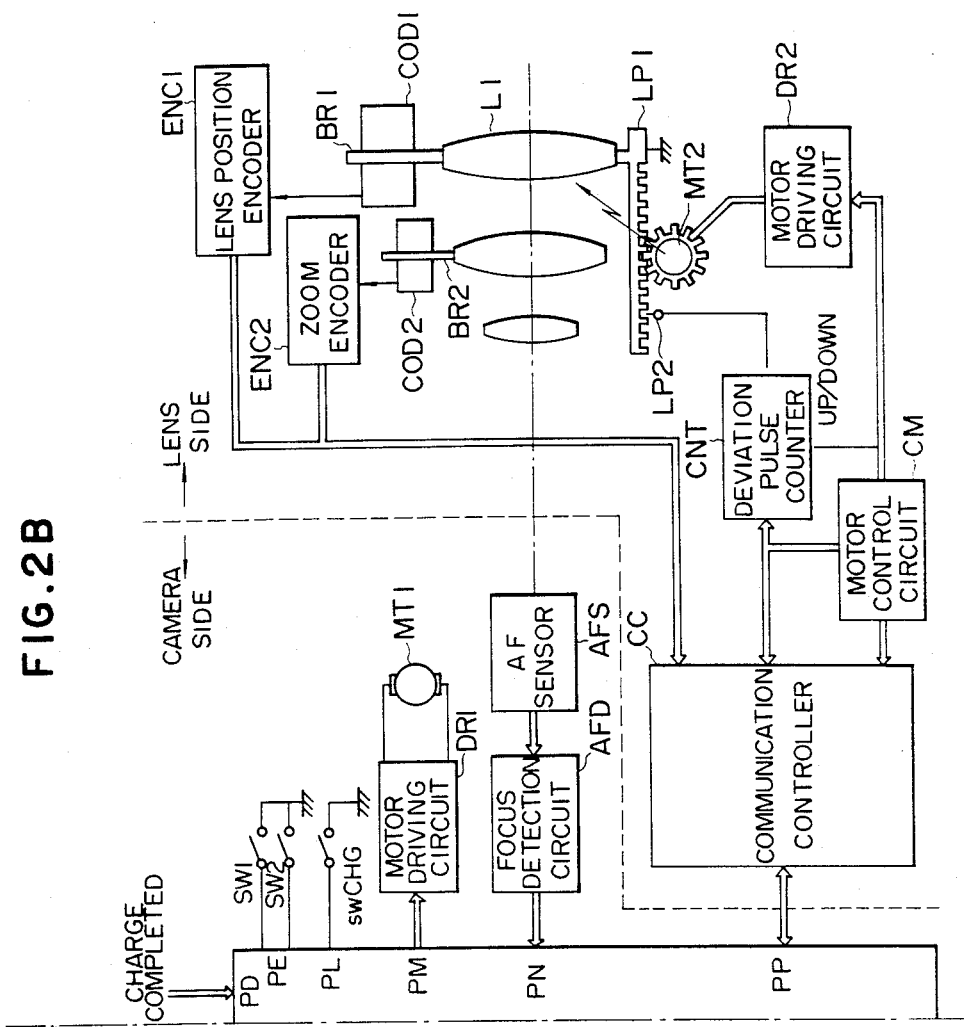

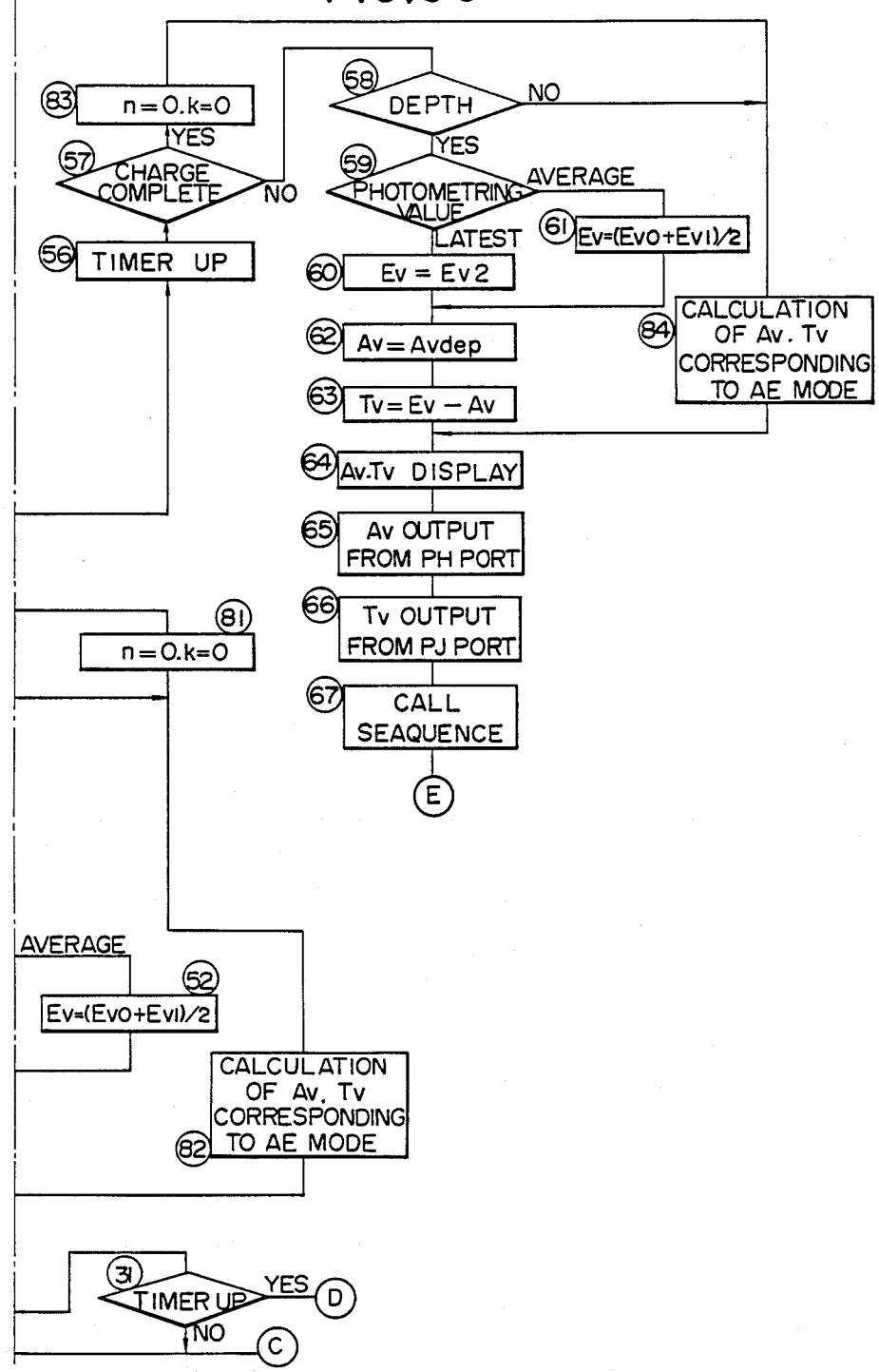

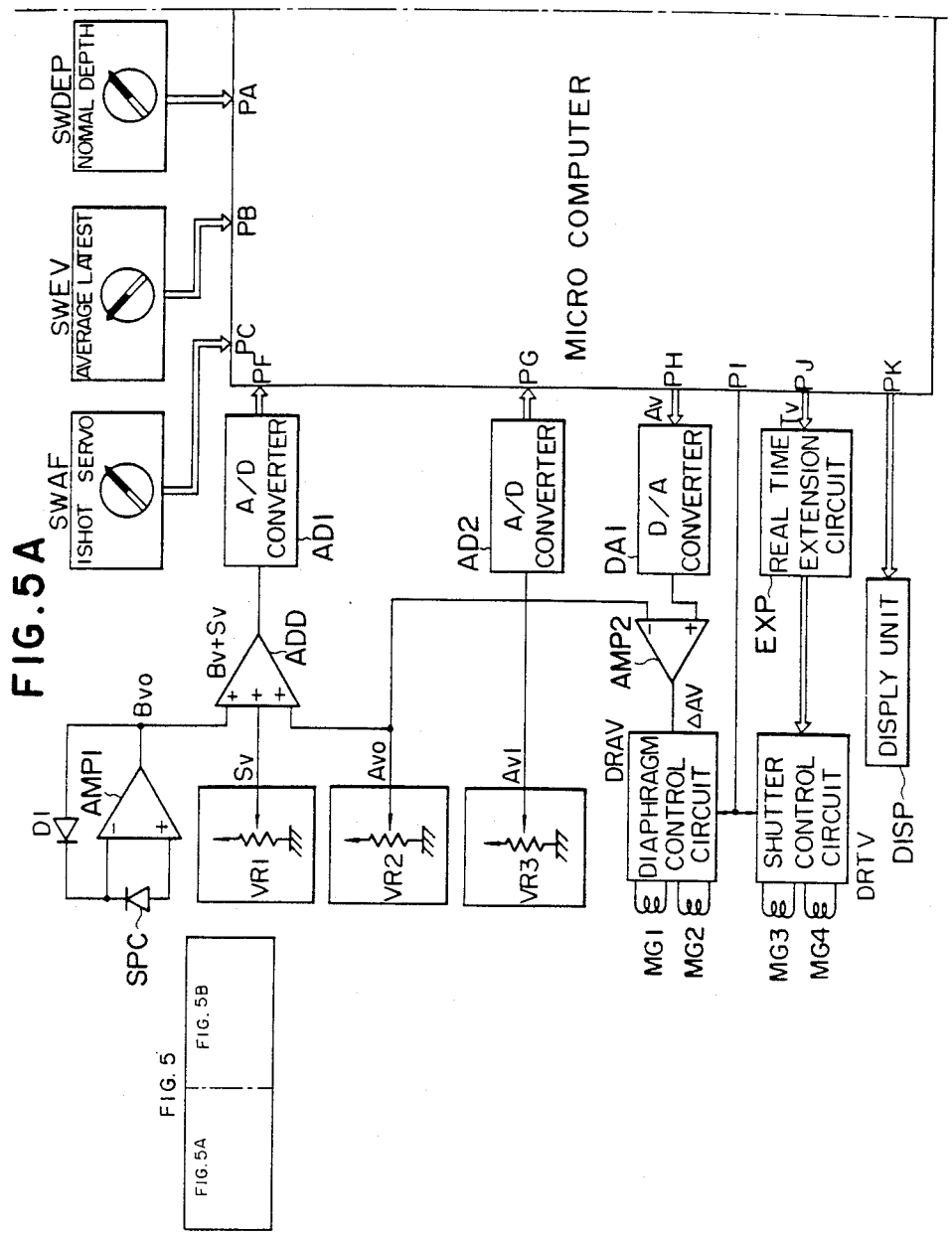

FIG.6A
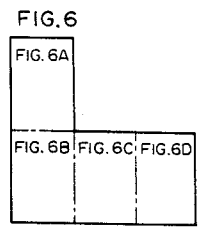
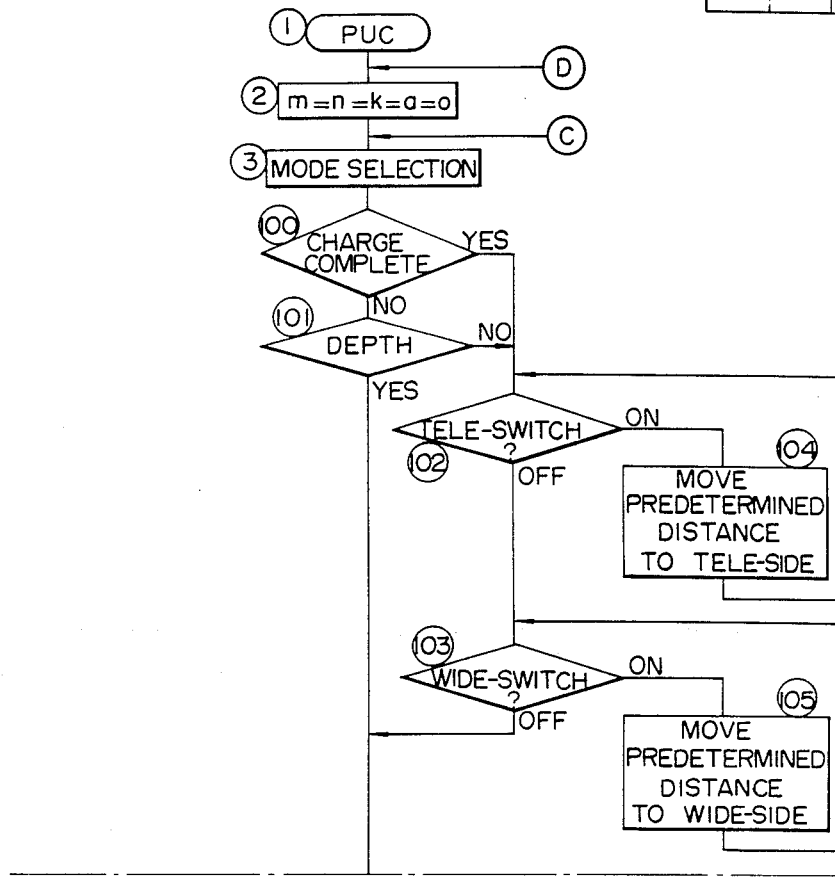

CAMERA HAVING AUTO-FOCUSSING DEVICE

BACKGROUND OF THE INVENTION

1. Field of the Invention

The present invention relates to a camera having an auto-focussing device.

2. Related Background Art

Conventionally, as a method of photographing in a state in which images of objects located at a plurality of different positions are focussed, an aperture is determined by setting the camera in the state of a stopped-down aperture and the respective objects are made to be located within the depth of field, while the photographer confirms the state of the objects.

Accordingly, photographing in the above-described situation is substantially affected by the experience and the like of the photographer and is therefore unsuitable to an amateur, and there has been a high probability of this resulting in a failure.

In addition, a camera is known in U.S. Pat. No. 4,219,261 in which respective in-focus positions are determined by manually operating the lens with respect to two different objects, an aperture value is determined from a difference between the in-focus positions, and an in-focus state is obtained for both objects, thereby determining the aperture.

However, the aperture value thus determined by the above-described method is effective for the focal length of the lens at that point of time, but, if a zooming state of the lens is altered after determination of the aperture value, the depth of field changes, so that it is impossible to obtain an in-focus state for both objects with that aperture value. In addition, in the aforementioned U.S. Patent, the lens is operated manually, and its operational efficiency has been poor.

To overcome this problem, the present applicant proposed a camera which is adapted to automatically determine an in-focus state for each object using an auto-focussing device so as to determine the aforementioned aperture.

SUMMARY OF THE INVENTION

Accordingly, an object of the present invention is to provide a camera of the above-described type which, even if the depth has changed as a result of zooming, is capable of constantly maintaining the camera in an in-focus state by conducting a compensation calculation with respect to a aperture determined when the zooming state of a zoom lens has been changed after determination of the aperture.

Another object of the present invention is to provide a camera which retrieves information on the focal length of a zoom lens and the aformentioned correction calculation is effected on the basis of the information on the focal length.

Still another object of the present invention is to provide a camera of the above-described type which inhibits an operation of changing a zooming state by a zoom lens after determination of the aperture.

Other objects, features and advantages of the present invention will become apparent from the following detailed description of the invention when read in conjunction with the accompanying drawings.

BRIEF DESCRIPTION OF THE DRAWINGS

FIG. 1A is a block diagram illustrating a basic arrangement of an embodiment of the present invention;

FIG. 1B is a diagram illustrating sequential processing in accordance with the embodiment of the present invention;

FIGS. 2A and 2B are diagrams illustrating a specific arrangement of the embodiment of the present invention;

FIGS. 3A to 3C and FIG. 4 are flowcharts illustrating the operation of a microcomputer shown in FIG. 2.

FIGS. 5A and 5B are circuit diagrams in accordance with another embodiment of the present invention; and FIGS. 6A to 6D are flowcharts illustrating the operation of the microcomputer shown in FIG. 5.

DESCRIPTION OF THE PREFERRED EMBODIMENTS

Figure 2A:
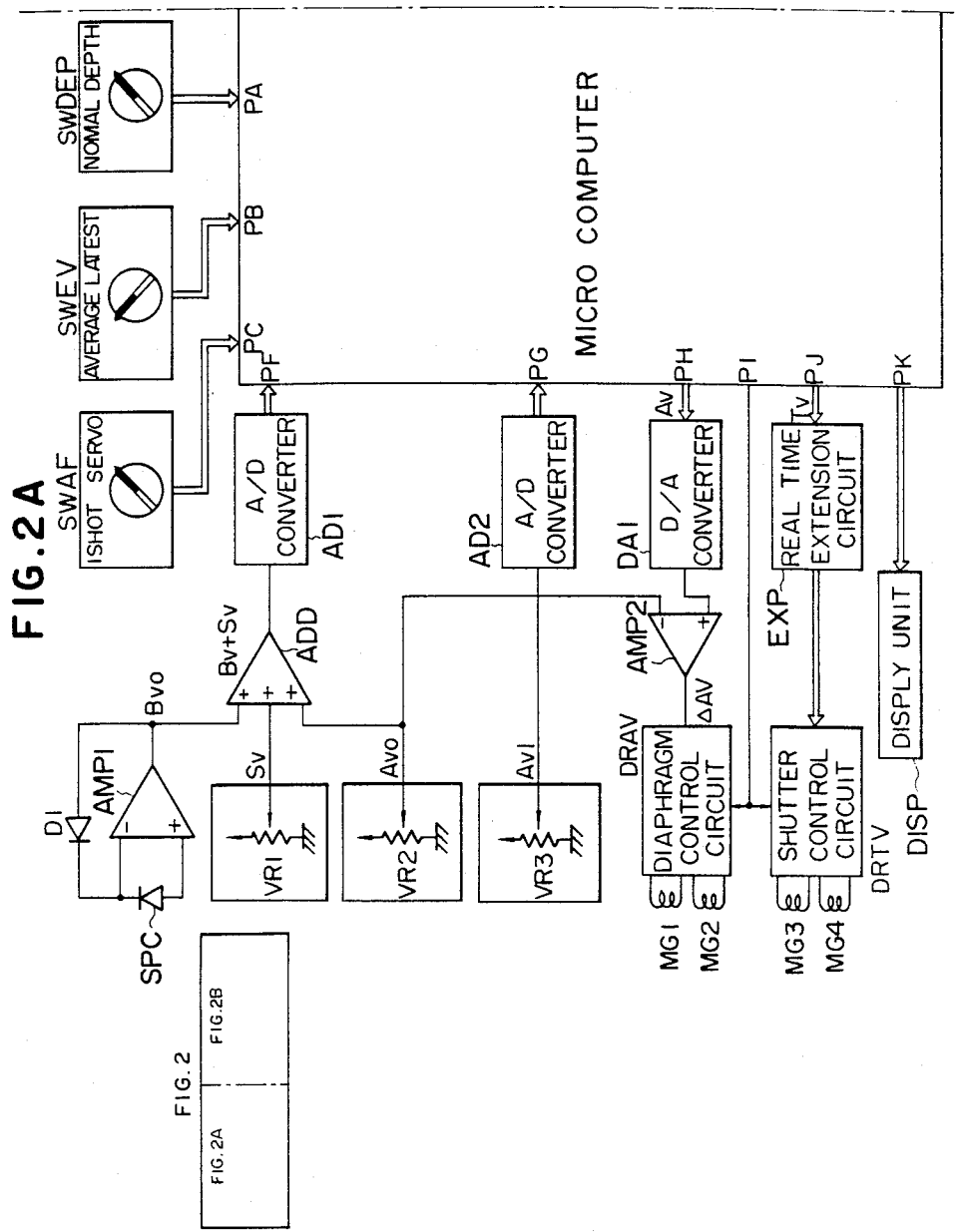

FIG. 1A is a block diagram illustrating a basic arrangement of an embodiment of the present invention, while FIG. 1B is a diagram illustrating sequential processing thereof.

A depth mode selection means 1 is for selecting a mode of preferential photographing at a depth of field (hereafter simply referred to as the "depth"). The depth mode is selected when it is desired to take a photograph in a state in which a plurality of objects at different distances are focussed.

After selecting the depth mode, the photographer first selects a near point-side object a as an object for distance measurement and turns ON a photometering switch sw1 by a first stroke of a shutter release button, thereby effecting an operation for the first depth. As a result, a calculation means 2 causes a distance measurement means 3 to measure the distance of the near point-side object a, and, upon obtaining an in-focus position, causes a photographic lens of the camera to be moved to the in-focus position by means of a lens driving means 4. That lens position is stored in a lens position memory means 5, and the fact that it is the first depth is stored in a counter means 6.

After temporarily turning OFF the photometering switch sw1, the photographer selects a far point-side object b as an object for distance measurement and performs an operation for the second depth by turning ON the photometering switch 1 again. Consequently, the calculation means 2 causes the distance measurement means 3 to measure the distance of the far point-side object b, and upon obtaining a defocus amount on an image plane, causes a defocus amount memory means 7 to store the same. In addition, the focal length of the photographic lens at that time is fetched from a focal distance signal output means 8 and is stored in a focal distance memory means 9. Furthermore, the fact that it is the second depth is stored in the counter means 6.

After temporarily turning OFF the photometering switch sw1, the photographer performs an operation for the third depth by turning ON the photometering switch sw1 after placing the near point-side object a and the far point-side object b within a photographic frame. As a result, the calculation means 2 reads out the defocus amount stored in the defocus amount memory means 7, calculates an intermediate position c by internally dividing a lens moving distance corresponding to that defocus amount at a predetermined ratio, e.g., 7:10, and then moves the lens to the intermediate position c by the lens driving means 4. At the same time, the calculation means 2 calculates the aperture in which both the near point-side object a and the far point-side object b enters the depth of field by dividing 7/17 (i.e., a defocus amount of the intermediate position c) of the defocus amount by a circle of confusion of 35 μm, and then causes a display means 10 to display that aperture. In addition, the fact that it is the third depth is stored in the counter means 6. The above three operations of the photometering switch sw1 completes the operation of determining the aperture on the basis of depths.

The calculation means 2 may fetch a photometric value from the photometering means 9 for each consecutive depth, or may fetch only the third depth. The calculation means 2 calculates a shutter time on the basis of the photometric information from the photometering means 11 and the calculated aperture on the occasion of the third depth, and causes the display means 10 to display the aperture together with the shutter time.

If zooming is effected to, for instance, the tele side after determination of the aperture, the depth of field becomes small, so that one or both of the near point-side object a and the far point-side object b moves away from the depth of field. Consequently, the picture becomes out of focus. To prevent this from happening, if the present focal length changes from the focal length stored in the focal length memory means 9, the calculation means 2 compensates the aperture such as to be adjusted to the present depth of field by multiplying the aperture by the square of a present ratio of the focal length to the stored focal length.

When the photographer turns ON a release switch sw2 simultaneously with the third depth operation or thereafter, the calculation means 2 outputs the aperture and the shutter time to an exposure control means 12 to have an exposure operation carried out. As a result, a photograph in which the near point-side object a and the far point-side object b and all other objects located therebetween are focussed can be obtained.

According to this embodiment, since the arrangement is such that the aperture in which both the near point-side object a and the far point-side object b are placed within the depth of field is calculated, an aperture which ensures that a plurality of objects are focussed can be automatically determined. In addition, if zooming is effected after the calculation of the aperture, the aperture is adapted to be compensated such as to conform to the change in the depth of field, and the aperture which has been determined once can be effectively utilized in compensation.

Although, in FIG. 1, the lens is not driven for the second depth, an arrangement may alternatively be provided such that the lens is driven for the second depth as well. In this case, the photographer is able to clearly confirm that the objects have been focussed for the first and second depths, so that the operations are easier to understand.

It goes without saying that the distance of the far point-side object b is measured for the first depth, and the distance of the near point-side object a is measured for the second depth.

The predetermined ratio for internally dividing a defocus amount is not restricted to 7:10 and may be 1 : 1. In addition, although the defocus amount of the intermediate position c is divided by a circle of confusion in order to calculate the aperture, the defocus amount may be converted into the aperture on the basis of a table.

Although, in the above description, the lens driving to the intermediate position c and the calculation of the aperture are conducted for the third depth, these operations may be performed for the second depth. Namely, an arrangement may be provided such that the operation of the lens driving to the intermediate position c and the operation of determining the aperture on the basis of the depth are completed by the second operation of the photometering switch sw1.

In FIG. 1, the photometering switch sw1, which is turned ON by the first stroke of the shutter release button, is used as an operating means. However, it is also possible to employ a separately provided photometering switch, or an operating means exclusively used for the depth may be provided.

A specific arrangement of the embodiment shown in FIG. 1 is shown in FIG. 2.

SPC denotes a light-receiving element for TTL full-aperture metering, DI denotes a diode for logarithm compression, and AMP1 denotes a calculation amplifier. These components constitute a photometering means and they output a luminance $B_{vo}$ (appex value) obtained from full-aperture metering. A variable resistor VR1 sets the film sensitivity and outputs a film sensitivity Sv. A variable resistor VR2 sets the full aperture Avo of the mounted lens. A variable resistor VR3 sets the minimum aperture Av1 (the minimum aperture on the aperture-decreasing side) of the mounted lens. An adder ADD calculates $Bvo + Sv + Avo = Bv + Sv = Ev$. AD1 and AD2 denote A/D converters, while DA1 denotes a D/A converter for converting the aperture Av output from a PH port of a microcomputer COM into an analog voltage. A subtractor AMP2 calculates a stopped-down aperture number $-Av = Av - Avo$. A diaphragm control circuit DRAV has a start magnet MG1 and a stop magnet MG2 for controlling the aperture and controls the aperture on the basis of the aperture stage number $-Av$. EXP denotes a real-time extension circuit. A shutter control circuit DRTV has a front curtain magnet MG3 and a rear curtain magnet MG4 and control the traveling of the front and rear curtains on the basis of the shutter time output from the real-time extension circuit EXP. A display unit DISP displays the calculated aperture, the shutter time, and the first and second depths. A microcomputer COM has PA to PP ports.

An AF mode selection switch swAF selects either a servo mode or a one-shot mode as the AF mode. A photometric value selection switch swEV selects either an average value of the first and second depths or the latest value of the third depth as a photometric value Ev in the depth mode. A depth mode selection switch swDEP selects either the depth mode or a normal mode. A photometering switch sw1 is turned ON by the first stroke of the shutter release button, while a shutter release switch sw2 is turned ON by the second stroke of the shutter release button. A charge switch swCHG is turned ON upon completion of the charging of the shutter and is turned OFF upon completion of the traveling of the rear curtain of the shutter. A charge motor MT1 drives a charging mechanism for the shutter and the like as well as a film winding mechanism. A motor driving circuit DR1 energizes the charge motor MT1. An AF sensor AFS receives a light image of an object made incident via a photographic lens L1. A focus detection circuit AFD calculates a defocus amount d on an image plane up to an in-focus position on the basis of a signal from an AF sensor AFS.

Each of the aforementioned elements, excluding the photographic lens L1, is disposed in the side of the camera, while each of the elements which will be described below is disposed in the side of the lens which is mounted on the camera, and communication on information is effected between the camera and the lens via a transmission controller CC.

A brush BR1 is interlinked with the movement of the position of the photographic lens L1. A code pattern plate COD1 detects the position (the position of a range ring) of the photographic lens 1 in cooperation with the brush BR1. A lens position encoder ENC1 codifies the lens position into a digital signal. A brush BR2 is interlinked with a change in the focal length due to zooming. A code pattern plate COD2 detects the focal length in cooperation with the brush BR2. A zoom encoder ENC2 codifies the focal length into a digital signal.

A motor control circuit CM controls the motor driving circuit DR 2 in response to a lens drive amount signal and a lens drive direction signal which are input from the PP port of the microcomputer COM via a communication controller CC, and determines an up mode or a down mode for a deviation pulse counter CNT. A lens drive motor MT2 is energized by the motor driving circuit DR2 in a direction corresponding to a lens-driving direction so as to move the photographic lens L1 in the direction of the optical axis. A comb-shaped pattern LP1 is interlinked with the movement of the photographic lens L1. An armature LP2 sends deviation pulses for each movement of a unit length of the photograhic lens L1 by coming into contact with the comb-shaped pattern LP1. A deviation pulse counter CNT is set by a lens drive amount signal input from the communication controller CC, counts deviation pulses input from the armature LP2, and instructs the motor control circuit CM to stop the lens drive motor MT2 when that count has coincided with a set value.

Figure 3A:
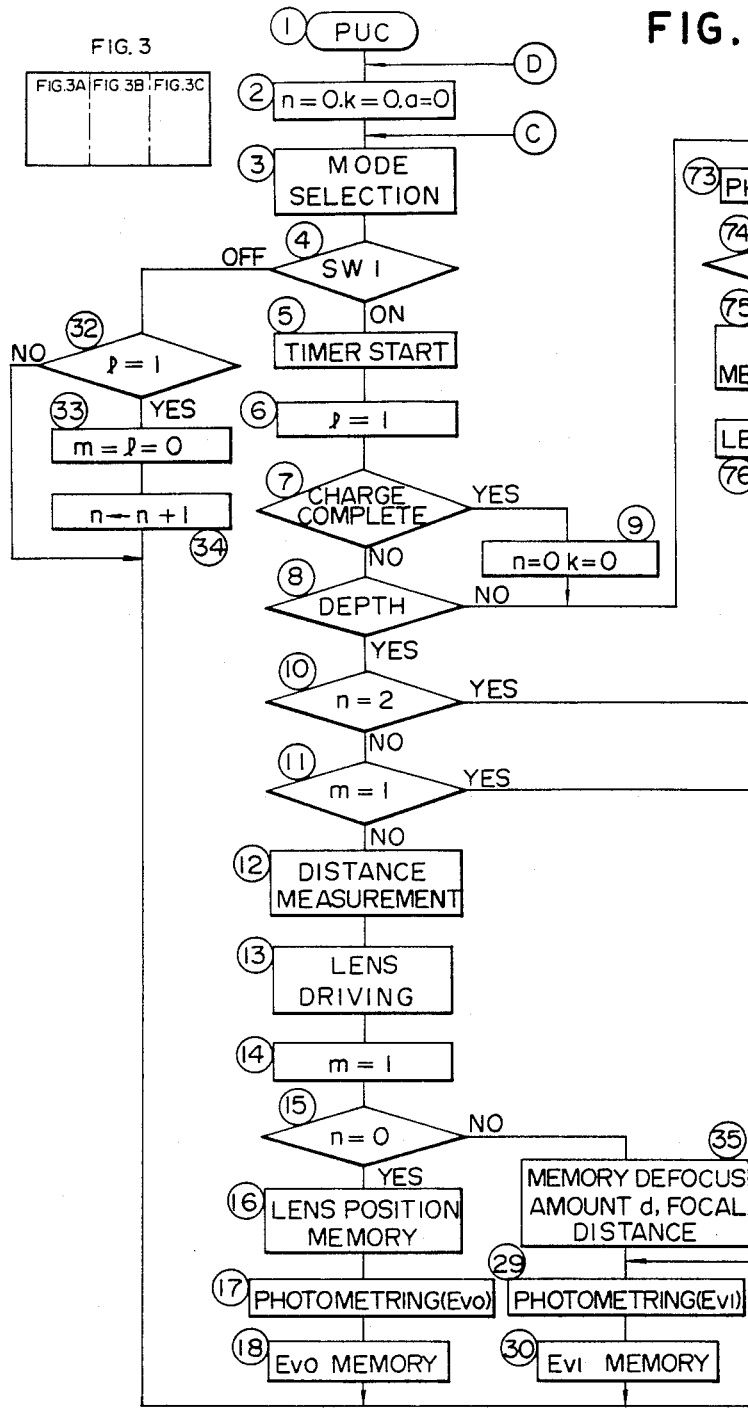
Figure 3B:
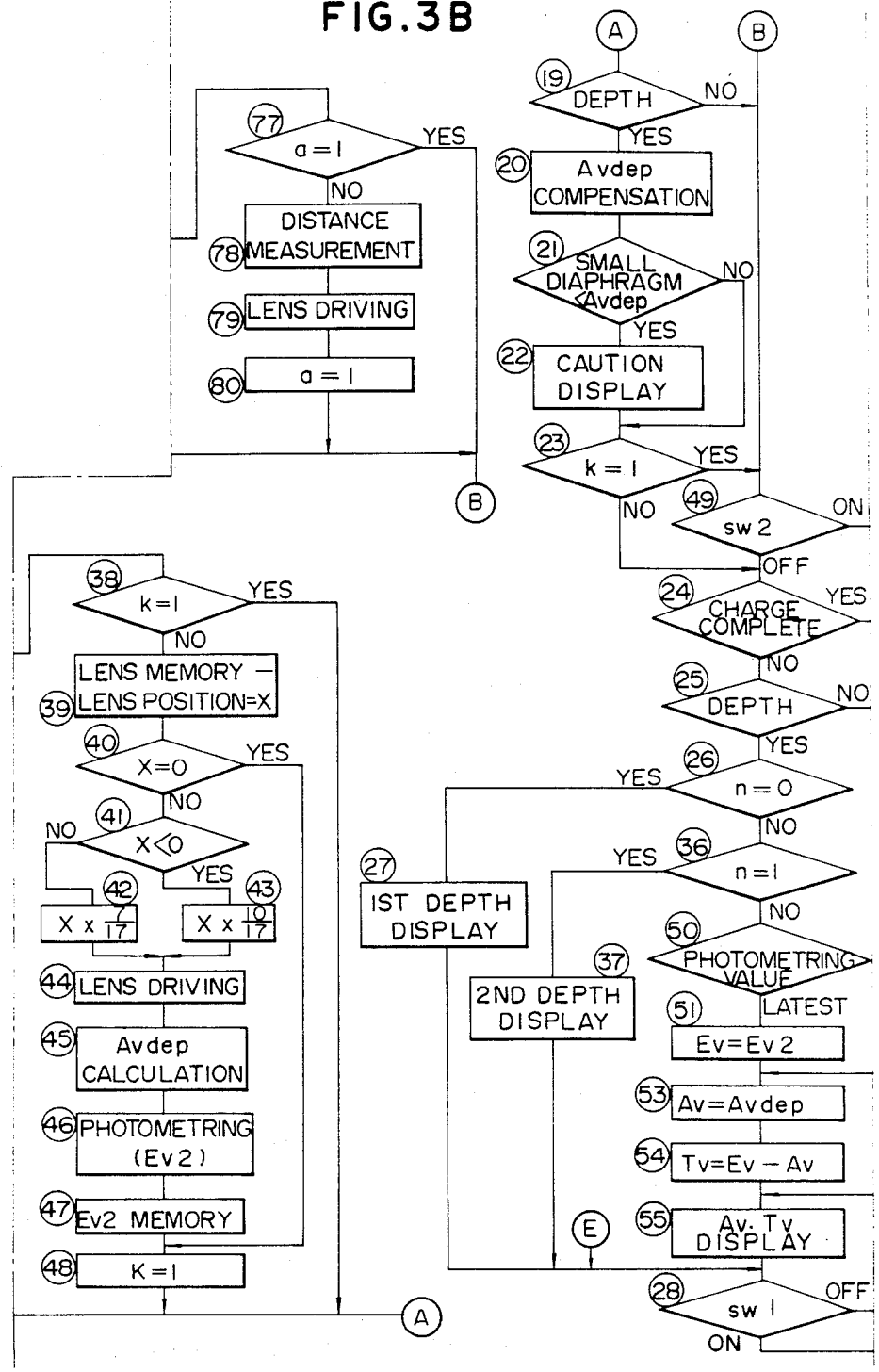
Figure 4:
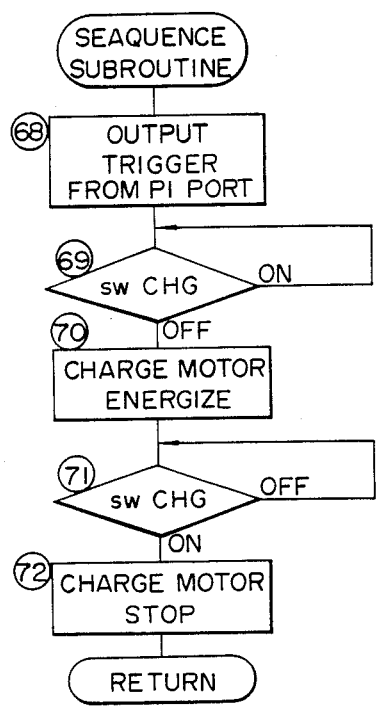

Referring now to flowcharts shown in FIGS. 3 and 4, a description of the operation of the microcomputer COM.

Step 1: The POWER UP CLEAR is effected when a power source (not shown) is turned ON.

Step 2: A n register indicating the current n-th depth (the number of pressing of the photometering switch sw1), a K register indicating whether or not an aperture determining operation based on the depth has been completed, and an a register indicating whether or not the distance measurement and lens driving have been completed in the one-shot mode are set to 0, respectively.

Step 3: Various modes are selected by the photographer. Let us now assume that the depth mode has been selected by the depth mode selection switch swD, and the photometering switch sw1 has been turned ON for the first time with respect to a first object.

Step 4: The state of the photometering switch sw1 is detected, and since it is ON, the operation proceeds to Step 5.

Step 5: The timer is started. This timer counts a predetermined time (e.g., 8 sec.) for holding the aperture determined by the depth after the turning OFF of the photometering switch sw1.

Step 6: A 1 register which indicates that the photometering switch sw1 has been turned ON is set to 1.

Step 7: It is detected whether or not a charge completion signal has been input from a stroboscope device mounted on the camera to the PD port, and, if NO is the answer, the operation proceeds to Step 8. If YES is the answer, the operation branches off to step 9, but this routine will be described later.

Step 8: A judgment is made as to whether or not the operation is in the depth mode. Since it has been assumed that it is in the depth mode, the operation proceeds to Step 10.

Step 10: A judgement is made of the present number of the depth, and since it is the first depth and n is set to 0, the operation proceeds to Step 11.

Step 11: A judgement is made of the m register which indicates whether the lens driving has been effected in the depth mode. Since the lens driving has not been effected in this case, the operation proceeds to Step 12.

Step 12: The focus detection circuit AFD is actuated, the defocus amount d of the image of the first object which is made incident upon the AF sensor AFS via the photographic lens L1 is fetched through the PN port.

Step 13: The lens driving amount and the lens driving direction are calculated from the defocus amount d obtained in Step 12, and are output from the PP port. As a result, the lens driving amount is set in the deviation pulse counter CNT, so that the up mode or the down mode is set in correspondence with the lens driving direction. The motor control circuit CM determines the forward or reverse rotational direction of the lens drive motor MT2 in correspondence with the lens driving direction. In addition, the motor control circuit CM actuates the motor driving circuit DR2, which in turn moves the photographic lens L1 in the direction of the optical axis. This movement in the direction of the opical axis is converted into deviation pulses by means of the comb-shaped pattern LP1 and the armature LP2 and is counted by the deviation pulse counter CNT. When this count coincides with a set amount of lens drive, a coincidence signal is output from the deviation pulse counter CNT to the motor control circuit CM, which in turn stops the drive of the lens drive motor MT2 by means of the motor driving circuit DR2. The photographic lens L1 moves by only the lens driving amount through the above operations and reaches the in-focus position.

Step 14: is stored in the m register. "m=1" means that the lens driving has already been conducted.

Step 15: A judgment is made as to whether or not the n register has been set to 0 (i.e., whether or not it is the first depth). Since it has been assumed that it is the first depth, the operation proceeds to Step 16.

Step 16: The lens position (the position of the range ring) for the first depth is stored in the built-in memory of the microcomputer COM.

Step 17: The photometric value Ev which is an output of the A/D converter AD1 is fetched through the PF port.

Step 18: The photometric value fetched in Step 17 is stored into the built-in memory as Ev0.

Step 19: A judgement is made as to whether or not the depth mode has been set.

Step 20: This is a step in which an aperture Avdep based on the depth is corrected in accordance with a change in the focal length due to zooming. However, since this is the first depth and the aperture Avdep has therefore not yet been determined, the operation passes this Step without undergoing any process.

Step 21: This is a step in which the aperture Avdep based on the depth is compared with the minimum aperture Av1 on the aperture-decreasing side. However, since this is the first depth and the aperture Avdep has not yet been determined, the operation passes this Step without undergoing any process.

Step 22: When the aperture Avdep based on depths is located on a further aperture-reducing side than the minimum aperture Av1 on the aperture-reducing side, the display unit DISP is caused to flicker to give a warning, but in this particular case the operation passes this Step 22 without undergoing any process.

Step 23: A judgment is made as to whether or not the K register is 1 (i.e., whether the aperture Avdep based on the depth has been determined). Since it has not yet been determined, the operation proceeds to Step 24.

Step 24: It is detected whether or not a discharge completion signal has been input from the stroboscope device. If it is assumed here that the signal has not been input, the operation proceeds to Step 25.

Step 25: A judgment is made as to whether or not the depth mode has been set.

Step 26: A judgment is made as to whether or not it is the first depth (n=0). Since the first depth is being handled now, the operation proceeds to Step 27.

Step 27: The display unit DISP is made to display the first depth.

Step 28: When the photometering switch sw1 remains ON, the operation returns to Step 3, passes through Steps 3-8, 10, and if the m register is set to 1 in Step 11, namely, if the lens driving has already been effected, the operation proceeds to Step 29.

Step 29: The photometric value Ev which is an output of the A/D converter AD1 is fetched through the PF port.

Step 30: The photometric value fetched in Step 29 is stored in the built-in memory as Ev1. Subsequently, the operation passes Steps 19 to 28 and returns to Step 3, and the above routine is repeated as long as the photometering switch sw1 remains ON. When the photometering switch sw1 is turned OFF, the operation branches off to Step 31 from Step 28.

Step 31: Even if the photometering switch sw1 is OFF, unless the time times out, the operation returns to Step 3, and branches off to Step 32 from Step 4.

Step 32: A judgment is made of the status of the 1 register. Since 1=1 in Step 6, the operation proceeds to Step 33.

Step 33: The m and 1 registers are reset to 0.

Step 34: 1 is added to the n register. As a result, the status of the n register becomes 1, which indicates that the second depth will be handled next.

Subsequently, Steps 19 to 26, 36, 37, 28, 31, 3, 4, 32, and 19 are repeated as long as the switch sw1 remains OFF in a state in which the timer has not timed out. In the process in which the above operations are carried out, if the photometering switch sw1 is turned ON for the second time with respect to a second object as the object of distance measurement, the operation proceeds from Step 4 to Step 5, and the operation for the second depth is commenced. In Steps 5 to 14, the operation proceeds in the same manner as the first depth, and in Step 12 the distance of the second object is measured. Subsequently in Step 13, the photographic lens L1 is moved to its in-focus position. In Step 15, since the depth being handled is the second depth (n=1), the operation proceeds to Step 35.

Step 35: The defocus amount d detected in the distance measurement of the second depth as well as the focal distance input from the zoom encoder ENC2 at that time are stored in the built-in memory. Subsequently, photometering is conducted in Steps 29, 30, the photometric value Ev1 is renewed, and the operation proceeds to Step 26 via Steps 19 to 25, and further proceeds to Step 36.

Step 36: A judgment is made as to whether or not the depth being handled is the second depth. Since it is now the second depth, and a setting has been made to n=1 in the foregoing Step 34, the operation proceeds to Step 37.

Step 37: The display unit DISP is made to display the second depth.

Subsequently, as long as the switch sw1 remains ON, the operation repeats Steps 28, 3 to 11, 29, 30, 19 to 26, 36, 39, and 28. In the process in which the above steps are being repeated, if the photometering switch sw1 is turned OFF, the routine of Steps 32 to 34 is executed following Step 4, and the m and 1 registers are set to 0, while the n register is set to n+1, i.e., 2. The operation then waits for turning ON of the photometering switch sw1 for the third time. Namely, if the switch sw1 subsequently remains OFF, the operation, following Step 34, proceeds to Steps 19 to 26, 36, 50, 51 or 52, 53 to 55, 28, 31, 3, 4, and 32, and this series of steps starting with Step 19 and ending with Step 32 is repeated.

In this process, if the photometering switch sw1 is turned ON for the third time with the first and second objects placed in the photographic frame, the operation for the third depth is commenced. This operation for the third depth proceeds from Step 3 to Step 8 in the same way as the first and second depths, and, in Step 10, the operation branches off to Step 38. Namely, since the setting has been made to n=2, as described above, the operation proceeds to Step 38 following Step 10.

Step 38: A judgment is made of the status of the K register. Since the aperture Avdep based on the depths has not been determined, and hence K=0, the operation proceeds to Step 39.

Step 39: The lens position stored in Step 16 on the occasion of the first depth is read out, and a difference X is determined between that lens position and the present lens position, which is the in-focus position for the second depth. Incidentally, the present lens position has been input to the PP port of the microcomputer COM via the encoder ENC1.

Step 40: If X=0, i.e., if the in-focus position for the first depth and that for the second depth are the same possible to take any value of aperture. Therefore, it is unnecessary to determine the aperture based on depths, so that the operation jumps to Step 48. Unless X=0, the operation proceeds to Step 41.

Step 41: If the distance of the far point-side object has been measured on the occasion of the first depth, and the distance of the near point-side object has been measured on the occasion of the second depth, the difference X becomes positive, so that the operation proceeds to Step 42. On the other hand, if the distance of the near point-side object has been measured on the occasion of the first depth, and the distance of the far point-side object has been measured on the occasion of the second depth, the difference X becomes negative, so that the operation proceeds to Step 43.

Step 42: An amount of lens movement and a lens driving direction from the present lens position to the intermediate point c (see FIG. 1B) are calculated on the basis of the calculation of X×7/17.

Step 43: An amount of lens movement and a lens driving direction from the present lens position to the intermediate point c are calculated on the basis of the calculation of X×10/17.

Step 44: The amounts of lens movement and lens driving directions calculated in Steps 42, 43 are output from the PP port. The lens drive motor MT2 is thereby driven, which in turn causes the photographic lens L1 to be moved to the intermediate position c.

Step 45: The defocus amount stored in Step 35 is read out, and the aperture Avdep based on depths is calculated on the basis of the following formula:

$$Avdep = d \times (7/17) \div 35 \, \mu m$$

Step 46: The photometric value is fetched.

Step 47: The photometric value fetched in Step 46 is stored in the built-in memory as EV2.

Step 48: Since the determination of the aperture Avdep based on depths has been completed, 1 is stored in the K register. Subsequently, the operation proceeds to Steps 19, 20 and onwards. If a zooming operation is carried out after the determination of the aperture Avdep based on depths has been completed, the depth of field varies as a result of a change in the focal length, so that the aperture Avdep must also be changed. Accordingly, in Step 20, a zooming state (the present focal length) is input via the encoder ENC2, and calculation of Avdep×(present focal distance / focal distance for the second depth)$^2$ is performed to effect calculation of the compensation of the aperture Avdep. This calculated value is set as A vdep.

The operation then proceeds to Step 21 to judge whether or not the aperture Avdep is such that the aperture is required to be further reduced than the minimum aperture Av1 on the aperture-reducing side, a warning is issued by the flickering of the display unit DISP in Step 22. In Step 23, since the determination of the aperture Avdep has now been completed, and hence K=1, the operation proceeds to Step 49.

Step 49: A judgment is made as to whether the release switch sw2 is ON or OFF. If it is assumed that the release switch sw2 is OFF, the operation proceeds to Step 50 via Steps 24 to 36.

Step 50: A judgment is made as to which has been selected by the photometric value selection switch swEV, between an average value and a latest value.

Step 51: If the latest value has been selected as the photometric value, the latest value Ev2 photometered in Step 46 for the third depth is stored in the Ev register. It is possible to obtain an exposure suited to an actual composition by using the latest value.

Step 52: If the average value has been selected as the photometric value, an average value of the first and second depths [=Ev0+Ev1)/2] is stored in the Ev register. By using the average value, it is possible to reduce the possibility of a failure in exposure even if there is a difference in exposure between the near point-side object and the far point-side object, i.e., in the case of white and black objects.

Step 53: The aperture Avdep based on depths is stored in the Av register.

Step 54: A shutter time Tv is calculated from the formula: Tv=Ev−Av.

Step 55: The display unit DISP is made to display the aperture in the unit of the F number and the shutter time in seconds on the basis of the Av, Tv of the apex value, respectively.

Subsequently, as long as the switch sw1 remains ON, the operation repeats Steps 28, 3 to 10, 38, 19 to 23, 49, 24, 36, 50, 51 or 52, 53, and 28.

Incidentally, in the above series of steps, when the determination of the aperture based on depths has not been completed, K=0, so that even if the release switch sw2 is turned ON, the operation to Step 49 from Step 23 and proceeds to Step 24. Hence, a shutter release operation is inhibited up to the third depth. Since on the occasion of third depth and thereafter, K=1, so that if the release switch sw2 is ON, the operation proceeds from Step 49 to Step 56. It is now assumed that the switch sw2 has been turned ON after the procedures up to the third depth were carried out, thereby allowing the operation to proceed to Step 56.

Step 56: The timer which was started in Step 5 is forcedly made to time out even in cases where a set time of the timer has not elapsed.

Step 57: A judgment is made of an input of a charge completion signal. If it is now assumed that the signal has not been input, the operation proceeds to Step 58.

Steps 58 to 64: An aperture Avdep in which both the first and second objects are located within the depth of field is calculated in the same manner as Steps 25, 50 to 55, and the shutter time Tv is also calculated on the basis of it and is displayed on the display unit DISP.

Step 65: The aperture Av is output from the PH port to the D/A conversion circuit DA1. Consequently, the subtractor AMP2 ouputs to the diaphragm control circuit DRAV a voltage corresponding to a stopped-down aperture number −Av.

Step 66: The shutter time Tv is output from the PJ port to the real-time extension circuit EXP.

Step 67: A sequence subroutine (Steps 68 to 72) shown in FIG. 4 is called.

Step 68: A trigger signal is output from the PI port to the diaphragm control circuit DRAV and the shutter control circuit DRTV to start the operation of both circuits. The diaphragm control circuit DRAV drives a diaphragm restricting member (not shown) by actuating the start magnet MG1 and also actuates the stop magnet MG2 when the diaphragm restricting member effects stopping down by the stopped-down aperture stage number -Av, thereby stopping the driving of the diaphragm restricting member. Consequently, the diaphragm is controlled to a value corresponding to the Avdep. Subsequently, the shutter control circuit DRTV actuates the front curtain magnet MG3 to allow the traveling of the front curtain. When the front curtain travels, the real-time extension circuit EXP starts a timing operation. When the time extended by the shutter time Tv has been timed, the circuit EXP sends a signal to the shutter control circuit DRTV to actuate the rear curtain magnet MG4, thereby allowing the rear curtain to travel. As a result, an exposing operation is completed.

Step 69: Since the charge switch swCHG is turned OFF upon completion of the traveling of the rear curtain, a judgment is made as to whether or not the switch swCHG has been turned OFF.

Step 70: The charge motor MT1 is energized by the motor driving circuit DR1 so as to effect charging of the shutter, the diaphragm as well as film feeding.

Step 71: By determining that the charge switch swCHG is ON, the completion of the charging operation is detected.

Step 72: The energization of the charge motor MT1 is stopped by the motor driving circuit DR1. The operation then returns to Step 28.

When continuous shooting is effected in the depth mode, when the operation returns to Step 28 after the first release operation has been carried out, the photometering switch sw1 and the release switch sw2 remain ON. Therefore, the operation returns from Step 28 to Step 3 and does not return to Step 2. Consequently, the state in which n=2 and K=1 is maintained, and the operation proceeds from Step 28 to Steps 3 to 10, 38, 19 to 23, 49, 56, ... Hence, the aperture Avdep and the measured value Ev0, Ev1, Ev2 obtained at the time of the first release are maintained during the continuous shooting, and shooting is effected repeatedly and continuously in the state at the time of the first release.

In addition, even if only the photometering switch sw1 remains ON not only in the case of continuous shooting but also after completion of a release operation, the operation returns from Step 28 to Step 3. Therefore, the aperture Avdep and the photometric values Ev0, Ev1, Ev2 at the time of release are maintained. Furthermore, when the photometering switch sw1 is switched OFF after it is kept ON for some time, the operation also returns from Steps 28 and 31 to Step 3 until the timer times out. Accordingly, the aperture Avdep and the photometric values Ev0, Ev1, and Ev2 at the time of the release are maintained. The reason for this arrangement is that, since the photometering switch sw1 needs to be turned ON three times in the depth mode, it takes time in the preparation for photographing, so that it is desirous to make use of the once-determined aperture Avdep as frequently as possible.

Incidentally, if the photometering switch sw1 is turned OFF and the timer has timed out, or if the photometering switch sw1 is turned OFF immediately after the release operation, the operation returns from Step 31 to Step 2. Therefore, the state becomes such that n=0 and K=0, th aperture Avdep and the photometric values Ev0, Ev1, Ev2 at the time of the release are not used in the subsequent photographing.

A description will now be given of a case where the charging of a main capacitor in the stroboscope device mounted on the camera is completed, and a charge completion signal is input to the PD port of the microcomputer COM. In this case, the operation branches off from Step 7 to Step 9 to reset the n register and the K register, so that the depth operation is suspended. The reason for this arrangement is that, when first and second objects are separated from each other by a certain distance (such a distance that the photographer desires to use the depth mode), there are many cases where a proper exposure is not obtained for both far and near objects. In this case, a change-over is automatically effected to the normal mode, and the operation therefore proceeds from Step 9 to Step 73.

Step 73: A photometric value Ev is fetched from the A/D converter AD1.

Step 74: The state of selection of the AF mode selection switch swAF is discriminated.

Step 75: If the servo mode has been selected, the distance of the object is constantly measured.

Step 76: In accordance with the results of distance measurement, if the object moves the lens is constantly moved to the in-focus position by following the same.

Step 77: When the one-shot mode has been selected, the a register is discriminated. When a=1, it means that the lens has been moved once to its in-focus position. In that case, the distance measurement and the lens movement are not carried out, and the operation proceeds to Step 49.

Steps 78, 79: The distance of the object is measured, and the lens is moved to its in-focus position.

Step 80: is stored in the a register.

In Step 49, a judgement is made as to whether the release switch sw2 is ON or OFF, and if OFF, an input of a charge completion signal is discriminated in Step 24. If there has been an input of said signal, the operation proceeds to Step 81.

Step 81: The n and K registers are reset to 0, and the operation proceeds to Step 82, which routine is not the depth mode.

Step 82: In accordance with a selected AE mode, the aperture Av and the shutter time Tv are calculated from the photometric value Ev obtained by photometering in Step 73, and the display unit DISP is caused to display them in Step 55.

When the ON state of the release switch sw2 is discriminated in Step 49, the operation proceeds to Steps 56, 57. An input of the charge completion signal is discriminated in Step 57, and if the signal has been input, the operation proceeds to Step 83.

Step 83: The n and K registers are reset to 0, and the operation proceeds to Step 84 which is not the depth mode.

Step 84: In accordance with a selected AE mode, the aperture Av and the shutter time Tv are calculated from the photometric value Ev obtained by photometering in Step 73. The display and release operations are then effected in Steps 64 to 67.

It should be noted that, in this embodiment, when the depth mode has been selected, the lens driving is restricted by the m register to once each for the first and second depth operations. Accordingly, this means that, when the depth mode is set, the AF mode is automatically set to the one-shot mode.

Figure 5B:
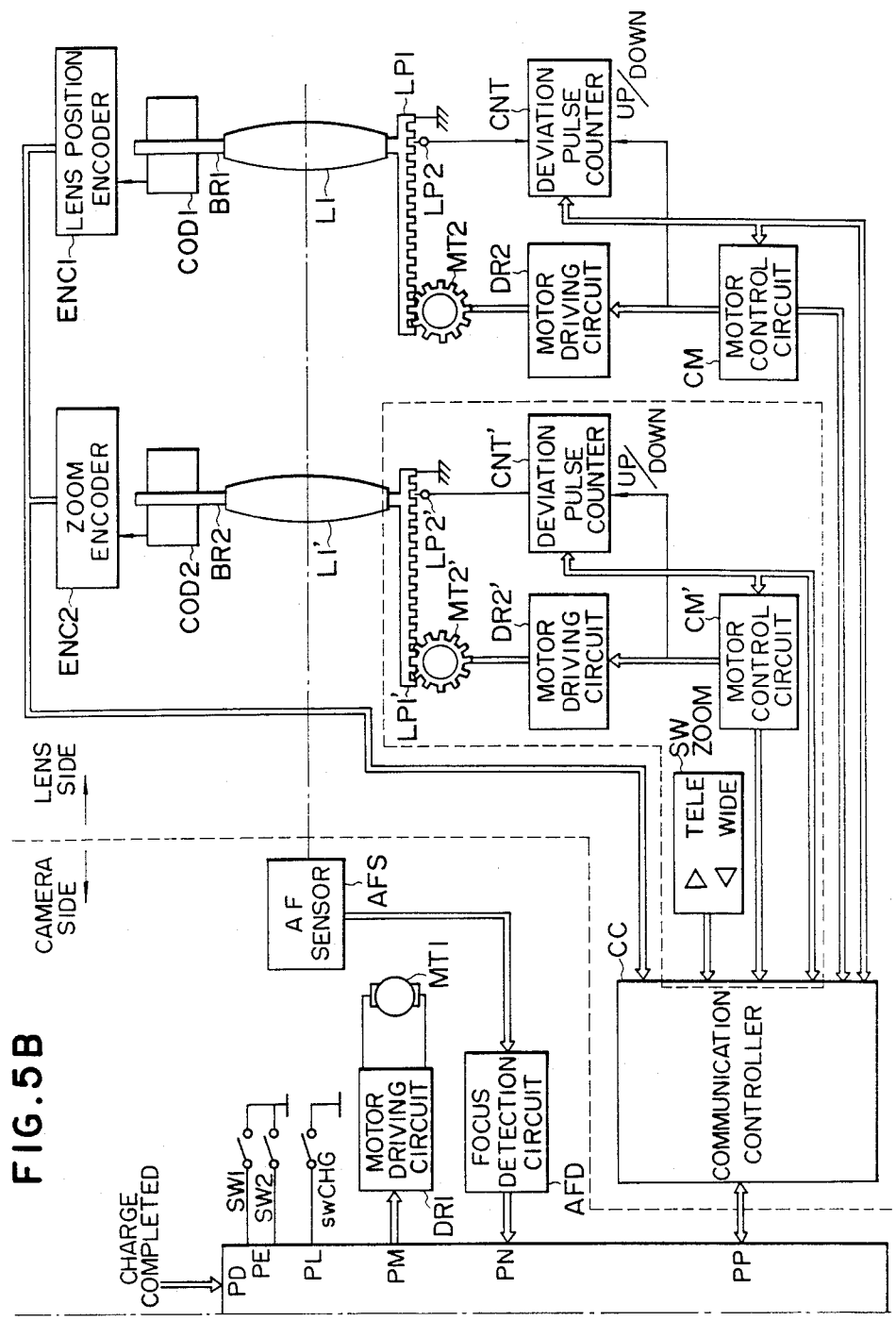

FIG. 5 is a circuit diagram illustrating another embodiment of a camera in accordance with the present invention, and the components that have the same arrangement as those shown in FIG. 3 are denoted by the same reference numerals.

The embodiment shown in FIG. 5 differs from that of FIG. 3 in that a power zoom is adopted, and the power zoom is inhibited in the depth mode.

In FIG. 5, a motor control circuit CM' controls a motor driving circuit DR2' in accordance with a lens drive amount signal for zoom adjustment and a lens driving direction signal for zoom adjustment that are input from the PP port of the of the microcomputer COM. Also, the motor control circuit CM' determines the up mode or down mode of a deviation pulse counter DNT'. A lens drive motor MT2' is energized by the motor driving circuit DR2' in a direction corresponding to the lens divng direction, so as to move a zoom adjusting lens L1' in the direction of an optical axis. A comb-shaped pattern LP1' is interlinked with the zoom adjusting lens L1', while an armature LP2' sends deviation pulses for each movement of a unit length of the zoom adjusting lens L1'. A deviation pulse counter CNT' is reset by a lens drive amount signal input from a communication controller CC', counts deviation pulses input from the armature LP2', and, instructs the motor control circuit CM' to stop the lens drive motor MT2' when that count has coincided with a set value.

Figure 6B:
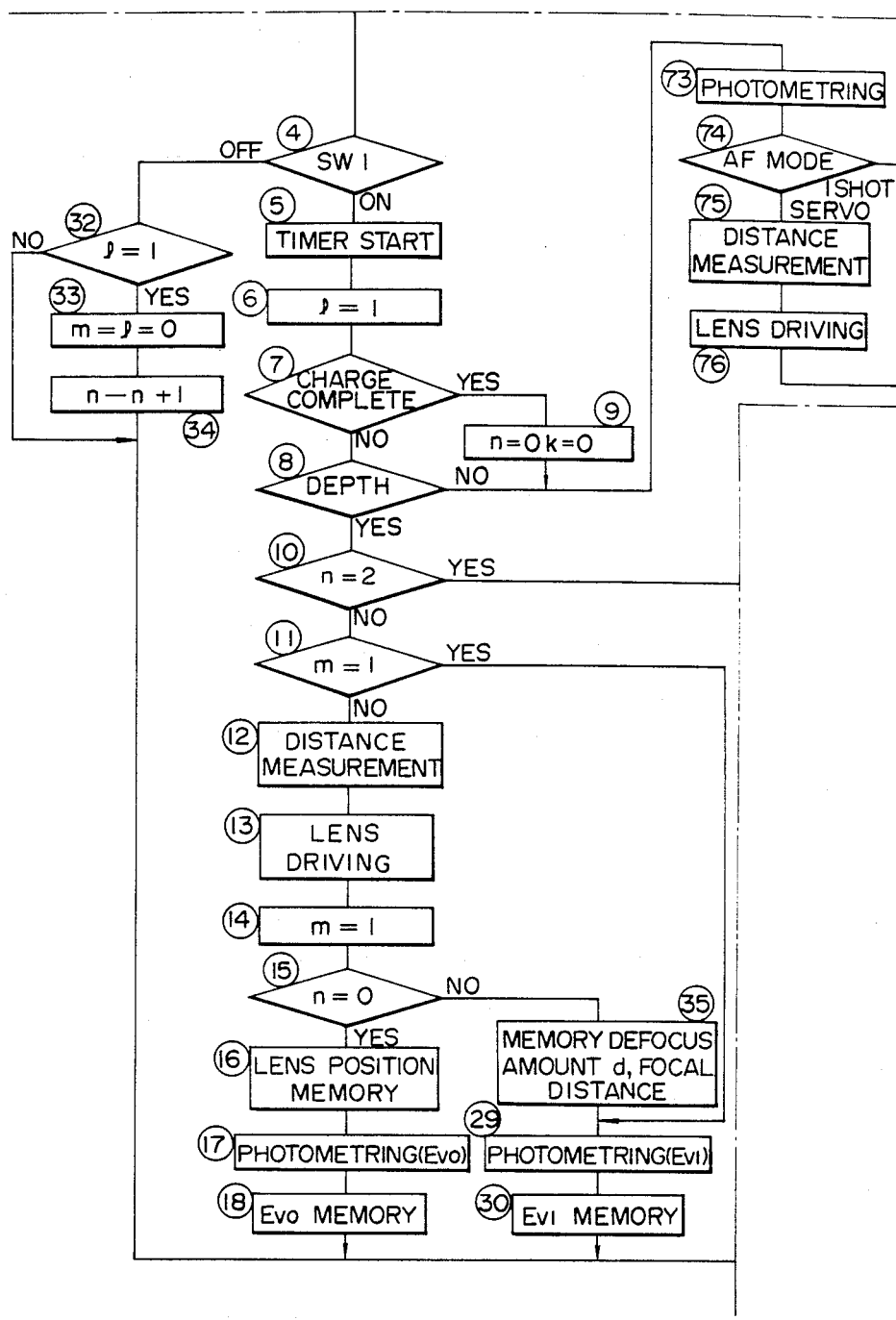
Figure 6C:
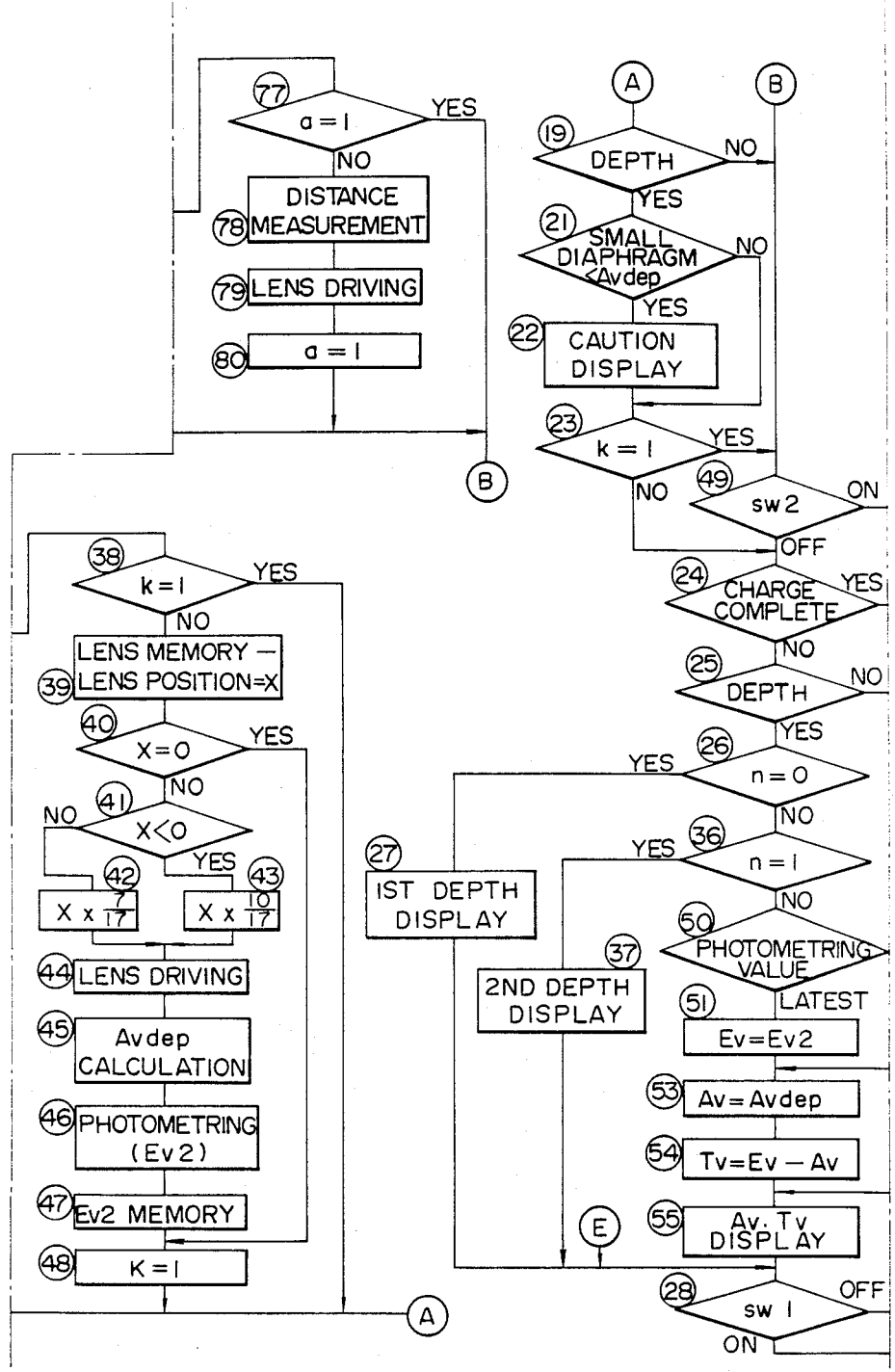
Figure 6D:
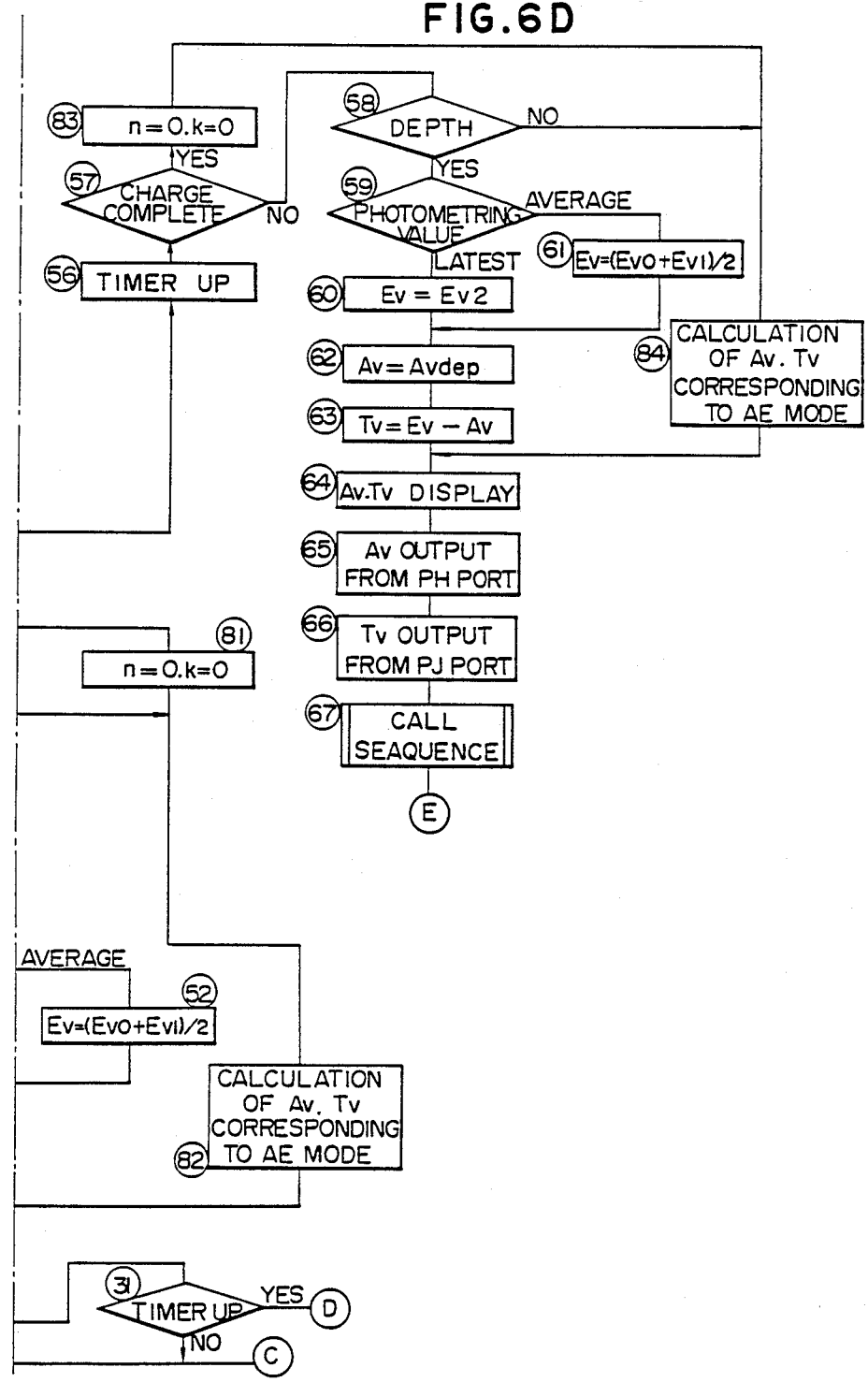

FIG. 6 is a flowchart illustrating the flow of a program in a microcomputer of the embodiment shown in FIG. 5. The circuit in FIG. 5 operates in accordance with a program shown in FIG. 6. The program shown in FIG. 6 is substantially identical with that of FIG. 3, but differs from the same only in that, in the program shown in FIG. 6, a formula, m=0, is added in Step 2, Steps 100–105 are added between Steps 3 and 4, and Step 20 is deleted. A description will now be given of the operation of the embodiment shown in FIG. 5 on the basis of FIG. 6.

Up to Step 3, the procedures are similar to those of FIG. 3, excepting that, in Step 2, a setting is made such that m=0, K=0, n=0, and a=0. In Step 3, the set mode is then sensed.

In Step 100 after Step 3, a judgment is made as to whether or not the charging of a flash unit has been completed, and the operation proceeds to Step 102 if it has been completed and to Step 101 if not.

It is now assumed that the charging has not been completed, and that the operation therefore proceeds to Step 101.

In Step 101, when the mode sensed in Step 3 is the depth mode, the operation proceeds to Step 4, and when not, the operation proceeds to Step 102. It is now assumed that the depth mode has not been selected by the depth mode selection switch swDEP. In this case, the operation proceeds to Step 102, and communication with the lens is effected through the PP port of the microcomputer COM, and a judgment is made as to whether or not an operation button TELE provided on the lens has been pressed. If it is now assumed that the button TELE has been pressed, the illustrated state of the switch in which the switch is turned ON when pressed is input to the microcomputer COM, and the operation then proceeds to Step 104. In Step 104, a signal on the amount of movement to the tele side by a predetermined amount is set to the deviation pulse counter CNT' via the PP port of the microcomputer COM. In addition, the motor control circuit CM' determines the rotation direction of the motor MT2' in accordance with the signal on the amount of movement to the tele side.

It should be noted that, at this juncture, the counting direction of the counter CNT' is also determined in accordance with the signal on the amount of movement to the tele side.

In addition, the motor control circuit CM' actuates the motor driving circuit DR2', thereby causing the zoom adjusting lens L1' to the tele side by the lens drive motor MT2'. This movement to the tele side is converted into deviation pulses by the comb-shaped pattern LP1' and the armature LP2', and these pulses are counted by the deviation pulse counter CNT'. When this count coincides with a set lens movement amount, a coincidence signal is output from the deviation pulse counter CNT' to the motor control circuit CM', which in turn makes the motor driving circuit DR2' to stop the driving of the lens drive motor MT2'. Through the above-described operations, the zoom adjusting lens L1' is moved to the tele side by a predetermined amount.

Subsequently, the operation returns to Step 102, and the above Steps 102 and 104 are repeated while the button TELE remains pressed, thereby driving the zoom lens L1' to the tele side.

When pressing of the button TELE is canceled during the above-described operation, the operation proceeds to Step 103, in which a search is made to determine whether or not an operation button WIDE has been pressed, in the same way as the button TELE. The operation proceeds to Step 105 if the button WIDE has been pressed, and to Step 4 if not.

If it is assumed that the button has been pressed, the signal on a predetermined amount of driving to the wide side is set to the counter CNT' as in the case of the aforementioned Step 104, and the lens L1' moves to the wide side substantially in the same manner as that described in Step 104, and keeps on moving to the wide end as long as the button WIDE remains pressed. Upon cancellation of the pressing of the button WIDE, the operation proceeds to Step 4.

In the foregoing Steps 102 to 105, the zooming state is set to the power zoom.

When it is detected in Step 101 that the depth mode has been selected, these steps 102 to 105 are not executed, and the depth mode is inhibited from being changed to the zooming state. Since the steps following Step 4 are identical to those shown in FIG. 3, a description thereof will be omitted. However, since Step 20 has been deleted, compensation of the aperture Avdep is not carried out.

Namely, in the depth mode, since a change to the zooming state is inhibited, as described above, a change in the focal length in the depth mode is not effected, so that there is no need for Avdep compensation, and the aperture Avdep is controlled as determined by Step 45.

As described above, in the embodiment shown in FIGS. 5 and 6, a change to the zooming state is inhibited when the depth mode is selected. Hence, shortcomings encountered when the zooming state is changed in the depth mode can be obviated.

As described above, in accordance with the present invention, there is provided a camera which is adapted to automatically calculate an aperture falling in the range of the depth of field with respect to different objects, wherein the calculated aperture is compensated when the zooming state has subsequently changed, and a zooming operation is inhibited after calculation of the aperture. Accordingly, it is possible to set an aperture having a depth of field within which all the different objects can be focussed.

What is claimed is:

1. A camera having an auto-focussing device, comprising:
    (a) a focus detection circuit for detecting a state of focus;
    (b) an aperture calculation circuit which determines a signal corresponding to an amount of defocus between a first in-focus position at which a first object is focussed and a second in-focus position at which a second object is focussed and determines an aperture value at which both said objects fall within a depth of field on the basis of a signal corresponding to said amount of defocus;
    (c) a compensation circuit for detecting information on the focal length of a zoom lens and compensating an aperture value determined by said aperture calculation circuit on the basis of said information on the focal length, said compensation circuit compensating the aperture value on the basis of said information on the focal length in accordance with a lens zooming state which is changed in such a manner that said objects fall within a depth of field which is changed in correspondence with a change in the depth of field at the time when the zooming state has been changed after the calculation of the aperture value on the basis of said signal corresponding to said amount of defocus.

2. A camera having an auto-focussing device according to claim 1, further comprising a driving circuit for driving an image-forming optical system to a position between said first and second in-focus positions.

3. A camera having an auto-focussing device according to claim 1, wherein said compensation circuit compensates said aperture value in correspondence with a ratio between the focal length determined at the time of determining said signal corresponding to said amount of defocus and a present focal length.

4. A camera having an auto-focussing device according to claim 3, wherein said compensation circuit determines an aperture value compensated by calculating $Avdep \times (f_2/f_1)^2$ where Avdep is an aperture value determined by said aperture calculation value, $f_1$ is a focal length at the time when said signal on said amount of defocus is determined, and $f_2$ present focal length.

5. A camera having an auto-focussing device according to claim 1, wherein said aperture calculation circuit determines said aperture value on the basis of an amount of defocus corresponding to a focussed state detected by said focus detection circuit with respect to said second object with said image-forming optical system set to said first in-focus position.

6. A camera having an auto-focussing device according to claim 1, wherein said compensation circuit has memory means for storing information on the focal length of said zoom lens at the time when a focussed state of said second object has been detected, and detects said information on the focal length of said zoom lens after said information on the focal length is stored by said memory means, and compensates said aperture value in accordance with a ratio between said information on the focal length stored in said memory means and said information on the focal length subsequently detected.

7. A camera having an auto-focussing device, comprising:
 (a) a focus detection circuit for detecting a state of focus;
 (b) a diaphragm control circuit having a first mode for controlling said diaphragm in correspondence with a preset aperture or an aperture based on an output of a photometering circuit and a second mode for determining an aperture in correspondence with a state of focus detected by said focus detection circuit and controlling said diaphragm in accordance with said determined aperture;
 (c) a selection means for selecting said first mode and said second mode;
 (d) zooming-state adjusting means for making a zooming state of a zoom lens variable; and
 (e) inhibit means for inhibiting an operation of changing the zooming state by said zooming-state adjusting means at the time when said second mode is selected by said selection means.

8. A camera having an auto-focussing device according to claim 7, wherein said zoom lens can be attached to said camera.

9. A camera having an auto-focusing device, comprising:
 (a) focus detection means for detecting a state of focus;
 (b) aperture calculation means for providing a signal corresponding to a difference between a first in-focus position at which a first object is focused and a second in-focus position at which a second object is focused, said positions being detected by said focus detection means, and for determining an aperture value at which both said objects fall within a depth of field on the basis of the signal corresponding to the difference;
 (c) compensation means for detecting information on a focal length of a zoom lens and compensating the aperture value determined by said aperture calculation means on the basis of the focal length information, said compensation means compensating the aperture value on the basis of the focal length information in accordance with a lens zooming state which is changed in such a manner that said objects fall within a depth of field which is changed in correspondence with a change in the depth of field at the time when the zooming state has been changed after the calculation of the difference.

10. An aperture determining device for a camera having an auto-focus device, comprising:
 (a) aperture determining means for generating a signal corresponding to a difference between a first focus adjusting position for a first object and a second focus adjusting position for a second object detected by the auto-focus device, and for determining an aperture value based on the difference signal;
 (b) compensation means for compensating the aperture value in response to a change of a zooming state of the camera when the zooming state is changed after the aperture value is determined by said aperture determining means, the compensated aperture value being determined so that said first and second objects are both within a depth-of-field which is varied by changing the zooming state.

* * * * *

UNITED STATES PATENT AND TRADEMARK OFFICE
CERTIFICATE OF CORRECTION

PATENT NO. : 4,829,331

DATED : May 9, 1989

INVENTOR(S) : Yoshihiko Aihara

It is certified that error appears in the above-identified patent and that said Letters Patent is hereby corrected as shown below:

FIG. 4 (Sheet 7):

Change "SEAQUENCE" to --SEQUENCE--.

COLUMN 1:

Line 52, change "a" to --an--.

COLUMN 6:

Line 47, change "Step 14: is" to --Step 14: 1 is--.

COLUMN 7:

Line 45, change "time times" to --timer times--.

COLUMN 8:

Line 51, change "possible" to --it is possible--.

UNITED STATES PATENT AND TRADEMARK OFFICE
CERTIFICATE OF CORRECTION

PATENT NO. : 4,829,331

DATED : May 9, 1989

INVENTOR(S) : Yoshihiko Aihara

It is certified that error appears in the above-identified patent and that said Letters Patent is hereby corrected as shown below:

COLUMN 10:

Line 10, change "and" to --and then--.

Line 44, change "MG1" to --MG1,--.

COLUMN 11:

Line 42, change "th" to --the--.

COLUMN 12:

Line 9, change "Step 80: is" to --Step 80: 1 is--.

Line 54, delete "of the" (second occurrence).

Line 57, change "DNT'." to --CNT'.--.

COLUMN 15:

Line 22, change "$f_2$ present" to --$f_2$ is a present--.

UNITED STATES PATENT AND TRADEMARK OFFICE
CERTIFICATE OF CORRECTION

PATENT NO. : 4,829,331

DATED : May 9, 1989

INVENTOR(S) : Yoshihiko Aihara

It is certified that error appears in the above-identified patent and that said Letters Patent is hereby corrected as shown below:

COLUMN 16:

Line 45, change "signal;" to --signal; and--.

Signed and Sealed this

Seventeenth Day of April, 1990

Attest:

HARRY F. MANBECK, JR.

Attesting Officer

Commissioner of Patents and Trademarks